United States Patent [19]

Mahlein et al.

[11] Patent Number: 4,989,937
[45] Date of Patent: Feb. 5, 1991

[54] LIGHT WAVEGUIDE COUPLER HAVING THREE OR MORE GATES AND UTILIZING THE BEAM SPLITTER PRINCIPLE AND THE METHOD FOR MANUFACTURE

[75] Inventors: Hans F. Mahlein, Unterhaching; Gerhard Winzer, Putzbrunn, both of Fed. Rep. of Germany

[73] Assignee: Siemens Aktiengesellschaft, Berlin and Munich, Fed. Rep. of Germany

[21] Appl. No.: 863,858

[22] Filed: May 16, 1986

[30] Foreign Application Priority Data

Jun. 3, 1985 [DE] Fed. Rep. of Germany ....... 3519808

[51] Int. Cl.$^5$ ................................................. G02B 6/26
[52] U.S. Cl. .............................. 350/96.15; 350/96.16; 370/1
[58] Field of Search ................... 350/96.15, 96.16, 320; 370/1, 3

[56] References Cited

U.S. PATENT DOCUMENTS

| | | | |
|---|---|---|---|
| 4,306,765 | 12/1981 | Winzer et al. | 350/96.16 |
| 4,317,699 | 3/1982 | Winzer et al. | 156/629 |
| 4,541,159 | 9/1985 | Michel et al. | 350/96.15 X |
| 4,564,755 | 1/1986 | Winzer et al. | 250/227 |
| 4,589,724 | 5/1986 | Winzer | 350/96.16 X |
| 4,637,682 | 1/1987 | Mahlein et al. | 350/96.15 |

OTHER PUBLICATIONS

E. Okuda et al., "Planar Gradient-Index Glass Waveguide and its Applications to a 4-Port Branched Circuit and Star Coupler", *Applied Optics*, vol. 23, No. 11, Jun. 1, 1984, pp. 1745–1748.

*Primary Examiner*—John D. Lee
*Assistant Examiner*—Phan T. Heartney
*Attorney, Agent, or Firm*—Hill, Van Santen, Steadman & Simpson

[57] ABSTRACT

A method for forming a three gate optical coupler, operating on a beam splitting principle, or a five gate optical coupler characterized by providing a carrier block having a pair of marks to define a line of a parting plane, creating a continuous branching waveguide structure having a waveguide node located adjacent to the parting plane of the carrier block by a ion exchange method, parting the carrier block in the parting plane, polishing the parted surfaces and forming a light transmitting optical layer, such as a frequency selective filter layer on a polished surface, then rejoining the two parts with the waveguides aligned. The method is particularly useful in forming three gate and five gate frequency multiplexers/demultiplexers, which have a continuous light waveguide structure except in the location of the frequency selective filter layer.

12 Claims, 4 Drawing Sheets

4,989,937

LIGHT WAVEGUIDE COUPLER HAVING THREE OR MORE GATES AND UTILIZING THE BEAM SPLITTER PRINCIPLE AND THE METHOD FOR MANUFACTURE

BACKGROUND OF THE INVENTION

The present invention is directed to a method for manufacturing of light waveguide couplers having three or more gates and utilizing a beam splitter principle and to the waveguide couplers produced by the method.

A method of forming a light waveguide coupler that uses a beam splitter principle is disclosed in U.S. Pat. No. 4,317,699, whose disclosure is incorporated by reference thereto and which patent claimed priority from the German Application No. 28 51 679. As disclosed, a carrier member supports a branching light waveguide structure and is manufactured with a branching guide channel structure comprising a through guide channel from which guide channels branch off. This channel structure is first produced in a surface of a carrier member, then a through glass fiber light waveguide is placed in the through guide channel and a glass branching fiber light waveguide is placed in each of the branching guide channels and is arranged with the branching fiber abutting laterally against the fiber in the through channel. To permanently fix the fibers in the guide channels, the branching light waveguide structures is covered with a cover member which is permanently connected to the carrier. Subsequently, the member with the cover secured thereon is cut into two parts, the cut surfaces formed in each of the parts are then polished to an optical quality and then a coating step occurs to provide a beam splitting layer and the two parts are then rejoined together with the waveguides of one part being aligned with the waveguides of the other part.

In the step of manufacturing the branching guide channel structure, the surface of the main carrier is covered with a mask having spaces corresponding to the guide channel structure and this structure is subsequently etched into the carrier member. The method of the patent also discloses providing polishing marks which will indicate when the polishing of the cut surfaces should end so that the beam divider provided on the polished cut surface is in the desired position relative to the waveguide structure when the parts are reassembled to form the coupler.

Another type of branching light waveguide structure is manufactured by an ion exchange method in a carrier member of glass. Such a method is disclosed in an article by Eiji Okuda et al "Planar gradient-index glass waveguide and its applications to a 4-port branched circuit and star coupler", *Applied Optics*, Vol. 23, No. 11, June 1, 1984, pages 1745-1748. As disclosed in this article, a continuous waveguide structure is formed in a substrate or member of optically homogeneous glass by providing a metal film, such as of titanium, on a surface of the glass substrate with this metal film acting as a mask against the ion diffusion. The desired pattern for the branch waveguide is formed by selective etching of this film and preferrably, the glass substrate is an alkyli borosilicate glass. The glass substrate is then immersed in a molten salt bath containing A-ions that will increase the refractive index of the glass with the bath being at a temperature of 500°-600° C. The A-ions will diffuse through the exposed portions of the mask into the glass substrate and this diffusion is accelerated by applying an electrical field in the direction of the thickness of the glass member. This will result in a high refractive index pattern with a half circle cross section being formed beneath the glass surface. After this first step, the mask pattern is removed by etching and the substrate with the higher index-refraction pattern is immersed in a second bath which is at 500°-600°, of molten salts containing B-ions that will modify the refractive index distribution in the glass substrate. These B-ions are diffused in the glass substrate in the same way as the first stage so that a buried waveguide structure will be produced. It is noted, that this article discloses forming branch circuits and star couplers but does not suggest forming couplers utilizing beam splitter principle.

A five gate wavelength selective branch coupler, which acts or utilizes a beam splitter technique, is disclosed in U.S. Pat. No. 4,564,755 whose disclosures is incorporated by a referenced and which claims priority from German application No. 32 30 570. In this coupler, three thick waveguides and two small diameter waveguides are arranged to form the five gate coupler. Two of the thick waveguides have a portion removed along one side to form a ground surface that receives a small diameter waveguide. One of these thick waveguides, with the small diameter waveguide, is aligned with the axis of another thick waveguide with the beam splitter extending therebetween at an angle of approximately 45° to the axis of the thick waveguides. Another pair of waveguides are arranged at right angles to the single thick waveguide and includes the other thick waveguide having a ground surface which receives a small diameter waveguide. The two small diameter waveguides are arranged with their axes intercepting in the plane of the beam splitter.

SUMMARY OF THE INVENTION

The object of the present invention is to provide a three gate light waveguide couplers and a five gate light waveguide couplers of a structure which is more easily manufactured than the previously known methods of forming such waveguides. In addition, the method is directed to producing the light waveguide couplers with three or more gates which is a simpler method of manufacture.

To accomplish these goals, the method of the present invention is directed to manufacturing a light waveguide coupler having at least three gates and utilizing a beam splitter principle, said coupler having a carrier member supporting a light waveguide structure with a branching node and branches extending therefrom, said structure being divided at the branching node by a partially transmitting optical layer. The method comprises steps of providing the carrier member of glass, providing two marks on the surface of the glass to define a line for a parting plane, manufacturing a branching light waveguide structure with a branching node in the carrier member by an ion exchange method with the branching node being at a point approximately adjacent the parting plane, parting the carrier member into two parts by cutting along the parting plane defined by said two marks, polishing the cut surface of each part to form two surfaces of optical quality, applying a partially light transmitting optical layer to one of the two surfaces of optical quality, then joining the two parts together with the other surface of the two surfaces of optical quality engaging the optical layer and the waveguides of one part being aligned with the waveguides of the other part to form the coupler.

The advantages of the present invention are that the manufacture of the branching light waveguide structure in the carrier includes a masking step, a first ion exchange step for introducing of a first ion type following a second ion exchange step for introducing a second ion type into the carrier member. After forming this waveguide structure, the method includes a parting step, a step of forming a partially light transmitting optical layer which includes the step of polishing the cut surfaces and the joining step can then follow immediately thereafter. Accordingly, the light waveguide couplers having three or more gates and utilizing a beam splitter principle can be manufactured with the method of the invention which essentially consists of only six method steps.

What is important in the light waveguide structure which is manufactured by means of an ion exchange method, is the portions of the structure at a point in or approximate to the branching node of the structure. This point is to be selected so that the losses of the finished coupling elements are optimally low. The marking of an optimum point of this type, which has been found, is exactly defined in accordance with the invention by two marks on the surface of the carrier which marks define a parting line for the parting plane and intersect this optimum point, thus the parting is undertaken along this line. It is realized, that the provisional of mark on a surface of the carrier is known from the above mentioned U.S. Pat. No. 4,317,699; however, these marks do not serve for defining a parting line but are polishing marks which indicated the depth to which the polishing can be taken to after the operation of cutting the member into two parts.

It should be noted, that the step of manufacturing the light waveguide structure by an ion exchange method includes providing a mask on the surface of the carrier member which has open spaces or windows through which the ion diffusion takes place to form the light waveguide structure and the two marks for defining the line of the parting plane or cut are arranged or marked on this mask. In one embodiment, these marks are formed as recesses or gaps in the mask with the adjacent portion of the mask material left or the remaining portion of the mask material is removed so that the marks can be utilized to align the parting plane. In another embodiment, the marks are strip portions of the mask which had been covered by an etching mask when the remaining metal layer forming the ion mask was being removed.

In accordance with the method of the present invention, a three gate wavelength multiplexer/demultiplexer based on the beam splitter principle can be manufacture wherein the partially light transmitting optical layer is composed of a frequency selective filter layer. The waveguide structure is continuous with no interruptions or break at the branching location and has a main waveguide which extends or procedes on a straight line and a light waveguide branching therefrom at a definite angle $\alpha$. The marks which define the parting line for the parting plane form a line that perpendicularly intersects the angle bisector of this angle $\alpha$ so that the parting plane is perpendicular to this angle bisector. In forming the mask for the structure, the branching light waveguide can be singularly curved such as at a point away from the branching node. The angle $\alpha$ can be selected to be around approximately 45° and the branching waveguide has a single curve away from the node so that the branch waveguide will eventually extend roughly parallel to the main waveguide. It is also possible that the angle $\alpha$ is closer to 0° than to 45° and that the branching waveguide has a double curve so that initially it curves away from the straight main waveguide and then curves in the opposite direction to extend roughly parallel to the main or straight waveguide.

The method can also be advantageously adapted to manufacture a five gate wavelength multiplexer/demultiplexer which utilizes a beam splitter principle. In this arrangement, the step of applying the partially light transmitting optical layer provides a frequency selective filter layer. The step of manufacturing the branching light waveguide structure with a branching node provides a waveguide structure which has four branches extending from the branching node which four branches are arranged to extend from a main or first waveguide. These four branches are arranged in two pair with the first pair being composed of a small diameter waveguide and a large diameter waveguide having axes which extend parallel to the axis of the main waveguide and the first pair is separated therefrom by the frequency selective filter layer. The second pair also includes a small diamter waveguide and a large diameter waveguide whose axes are parallel to each other and perpendicular to the axis of the main waveguide with the axis of the small diameter waveguide being positioned to intersect the axis of the small diameter waveguide of the first pair. Preferrably, each of the branching waveguides of the two pair at a distance away from the branching node curve away from each other and subsequently then curve in the opposite direction to extend parallel again at a space relationship to each other. In order to prevent undo loss of light, the radii of curvature of the curve portions of the light waveguide structures are selected to be of a millimeter size.

DESCRIPTION OF THE PREFERRED EMBODIMENTS

Figure 5:
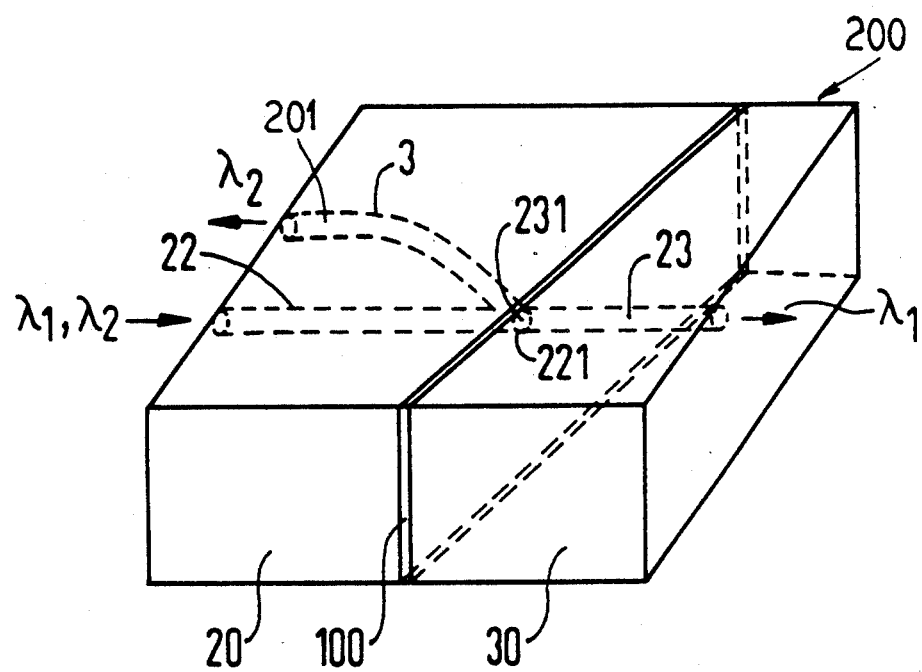
FIG. 5 is a perspective view with the two cut parts reassembled and joined together with the optical waveguides of one part being aligned with the optical waveguides of the other part.
Figure 7:
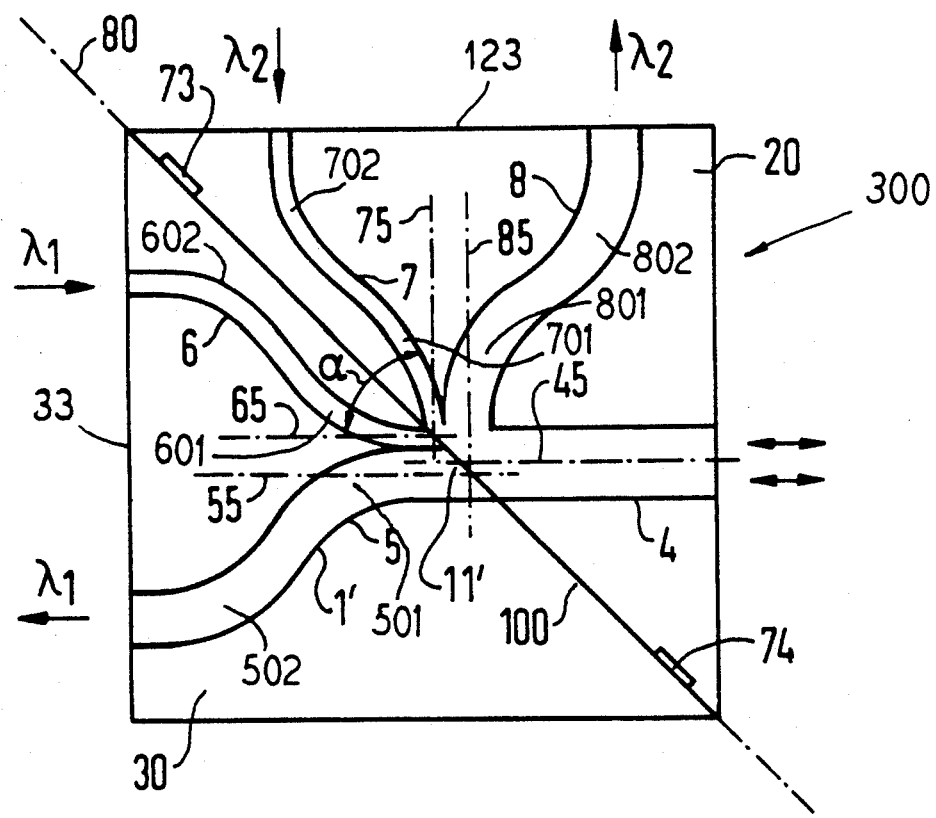
FIG. 7 is a plan view of a five gate multiplexer/demultiplexer manufactured in accordance to the present invention.

The principles of the present invention are particularly useful in manufacturing a three gate multiplexer/demultiplexer generally indicated at 200 in FIG. 5 or to manufacture a five gate multiplexer/demultiplexer generally indicated at 300 in FIG. 7.

Figure 1:
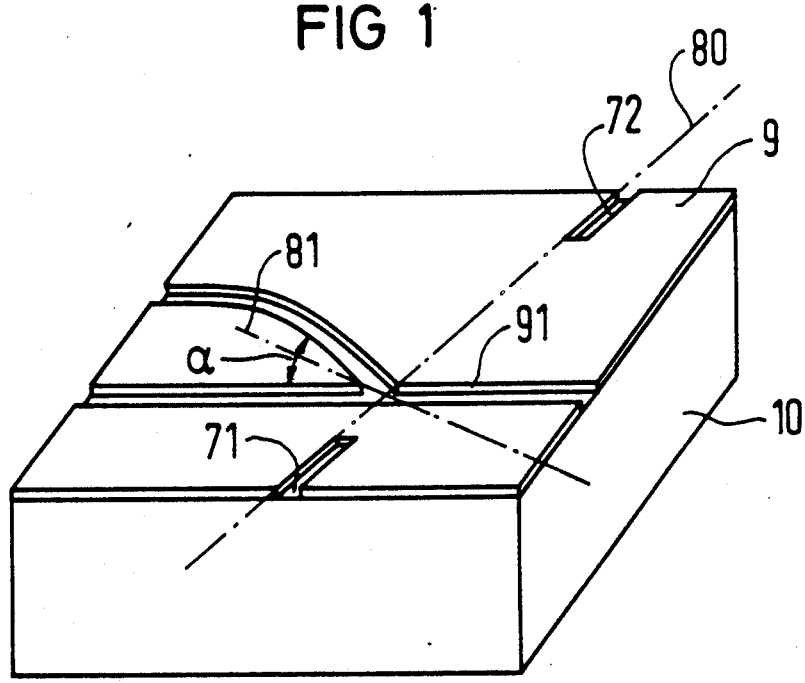
FIG. 1 is a perspective view of a carrier member having a surface provided with a mask.
Figure 2:
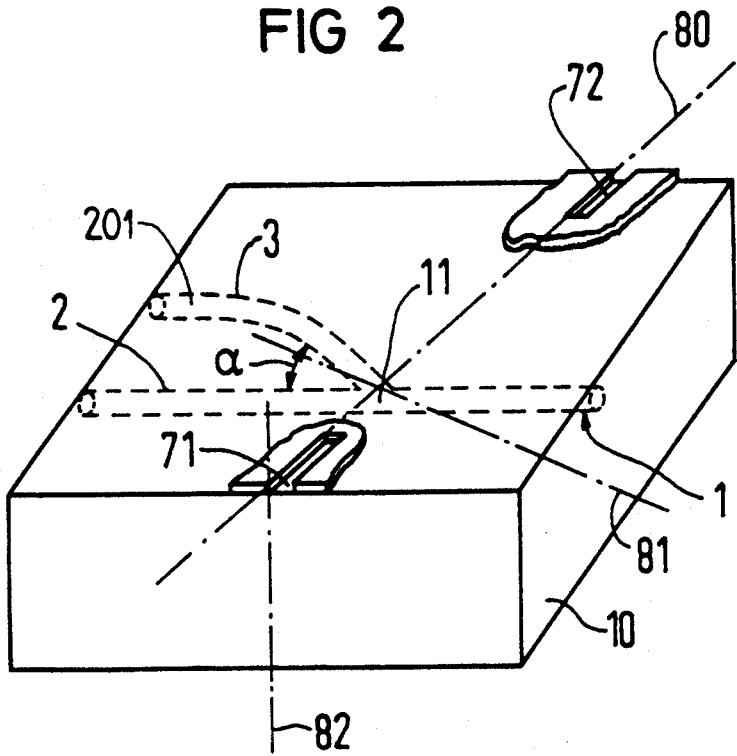
FIG. 2 is a perspective view of the carrier member of FIG. 1 after the manufacture of the light waveguide structure in the member and after the removal of a majority of the mask.

To produce the three gate multiplexer/demultiplexer 200 of FIG. 5, the method procedes by providing a carrier member 10 (FIG. 1) of glass, forming a layer of metal such as titanium on a surface of the cuboid-shaped carrier member 10, etching the metal layer to form a mask 9 having openings 91 through the metal layer in a shape corresponding to a light waveguide structure and also having a pair of openings 71 and 72 which form a pair of marks defining a parting line 80 for a parting plane which will pass through or adjacent a node 11 (FIG. 2) of a branch waveguide structure 1 which is subsequently formed in the glass member 10. The light waveguide structure 1, as illustrated in FIG. 2, is a continuous structure composed of a straight light waveguide or main waveguide section 2 and a branch waveguide 3 which branches from the main waveguide 2 with a single curve portion. The branching light waveguide 3 branches off at a definite angle $\alpha$, which, for example, can amount to approximately 40°. The branch waveguide initially procedes in a straight line away from the branching node 11 and is then bent so that its end portion 201 is extending roughly parallel to the straight waveguide 2. The parting line 80 extends perpendicular to a bisector 81 for the angle $\alpha$.

The manufacturing or forming of the waveguide structure 1 is created in the mask carrier member of FIG. 1 by an ion exchange method which is mentioned hereinabove and is known.

It is noted, that portions of the mask in the regions or area adjacent to the recesses or openings 71 and 72 remains although the remaining portions of the mask have been removed.

Figure 3:
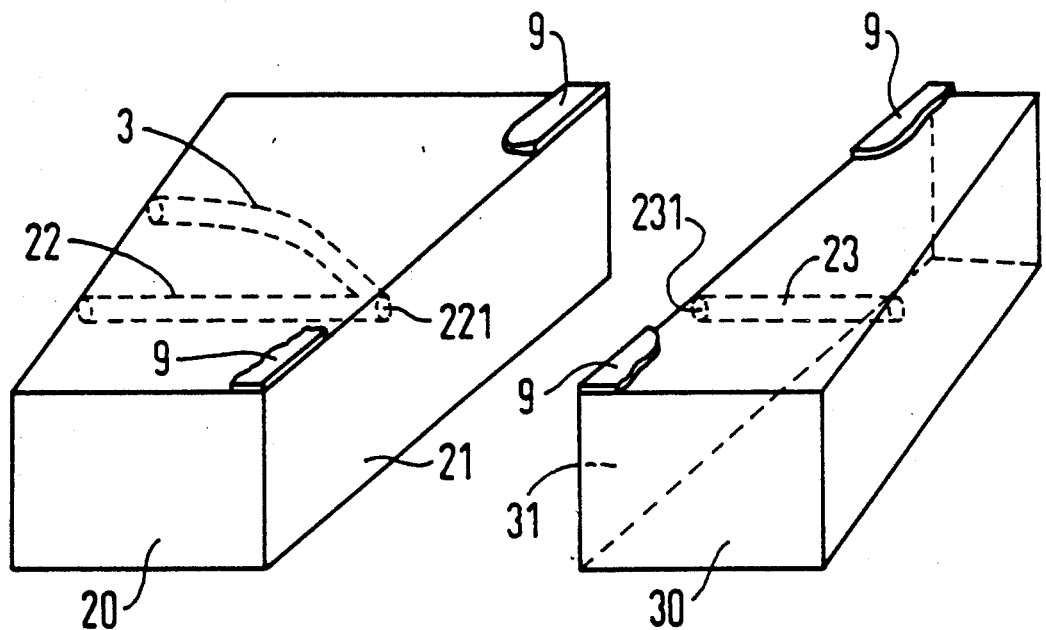
FIG. 3 is a perspective view after the carrier member of FIG. 2 has been cut into two parts.

The carrier member 10 having the waveguide structure, which is free of any breaks or gaps between its main and branch sections, is now parted in a parting plane which is defined by the line 80 and a perpendicular line 82 and this parting plane extends perpendicular to the angle bisector 81. This step of parting is preferrably undertaken with either a saw having a width of the width of the strip-shaped recesses or openings 71 and 72 or by some other type of cutting tool. Subsequent to cutting on the plane defined by the line 80 and 82, the member with the waveguide structure is separated into two parts 20 and 30 (FIG. 3). It is noted, that the parting line 80 is place such that it intersects the branching node 11 or a point approximate to the branching node. The branching node 11 is defined as the intersection of the axis of the straight line waveguide 2 with the axis of the branching light waveguide 3.

The part 20 will have a straight waveguide section 22 and the branch waveguide 3 with the waveguides having an end face 221 lying in a cut surface 21 of the part 20. In a similar manner, the part 30 has a cut face 31 and contains a straight waveguide section 23 having an end face 231 lying in the plane of the end face 31. It should be noted that two straight waveguides sections 22 and 23 were formed by the single original straight waveguide 2 when the two parts were formed by the severing action. It also should be noted, that when the two parts are again subsequently joined together that two waveguides sections 22 and 23 will again form the original straight waveguide 2.

Figure 4:
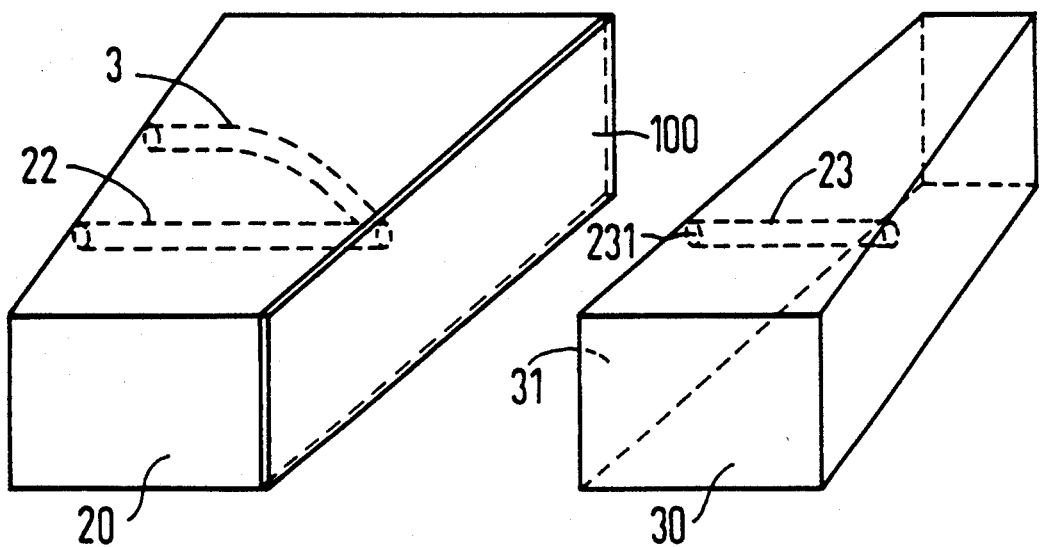
FIG. 4 is a perspective view similar to FIG. 3 showing the optical layer applied to one of the cut surfaces of one of the two parts.

Subsequent to the step of separating the member into the parts 20 and 30, the next step is to provide the frequency selective filter layer. First, the surfaces 21 and 31 are polished so that they become planer surfaces having optical quality. The frequency selective filter layer is then applied to one of these two surfaces of optical quality by a vapor deposition of a plurality of dielectric layers such as a dielectric multiple layer which will have a frequency selective characteristic. As illustrated in FIG. 4, the frequency selective filter layer 100 was applied to the polished surface of the part 20. Subsequent to applying the filter layer 100, the two parts 20 and 30 are reassembled and joined together so that the end faces 221 and 231 of the straight waveguides sections 22 and 23 are aligned and joined together with the filter layer 100 disposed therebetween. The joining is illustrated by the three gate coupler or multiplexer/demultiplexer of FIG. 5. In this embodiment, the filter layer 100 has its layers selected so that a defined wavelength $\lambda_1$ will be transmitted by the filter layer 100 while a wavelenth $\lambda_2$ will be reflected and not transmitted. Thus, light containing wavelengths $\lambda_1$ and $\lambda_2$ entering the waveguide 22 will have a portion of the wavelength $\lambda_1$ transmitted to the waveguide 23 while the $\lambda_2$ portion is reflected into the branch waveguide 3.

Figure 6:
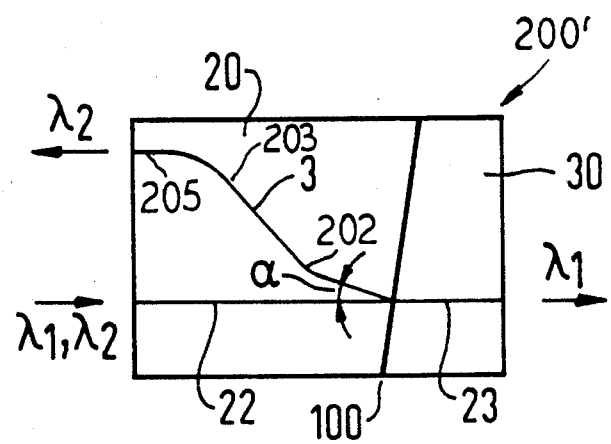
FIG. 6 is a plan view of a multiplexer/demultiplexer according to this present invention having a doubly curved branching waveguide.

An embodiment of the three gate multiplexer/demultiplexer is illustrated in FIG. 6 and indicated at 200'. This embodiment differs from the embodiment of the multiplexer/demultiplexer 200 of FIG. 5 in that the angle $\alpha$ lies closer to 0° than to 45° and is for example 15°. Another difference is that the branching light waveguide 3' is doubly curved with the first curve portion 202 being initially away from the straight waveguide 22 and second curve portion 203 being back towards the waveguide 22 so that an end portion 205 extends substantially parallel to the straight waveguide 22. Another difference is that the frequency selective filter layer 100 is at a less pronounced slant relative to the axis of the light waveguides 22 and 23 than it is in the multiplexer/demultiplexer 200 of FIG. 5. However, the layer 100 still extends perpendicular to the bisector of angle $\alpha$.

The method of the present invention can also be utilized to form a five gate multiplexer/demultiplexer 300 of FIG. 7. To form this structure, the mask is constructed to provide waveguide portions 4, 5, 6, 7 and 8. In addition, after forming the waveguide system 1', the mask is etched off except for strips 73 and 74 of the mask material which are left on the surface to define a parting line 80. The strip portion 73 and 74 of the metal mask are provided by leaving a strip-shaped covering which acts as an etching mask during the step of etching the previous metal mask from the member.

The light waveguide structure 1' (FIG. 7) has a main or first light waveguide 4 which is a straight thick waveguide quadruply branching off at a branching node 11' so there are two pairs of light waveguides with a first pair being light waveguides 5 and 6 and the second pair being the waveguides 7 and 8. The first pair of light waveguides 5 and 6 have their axes 55 and 65 initially parallel to an axes 45 of the main waveguide 4 and are then doubly curved so that the waveguides 5 and 6 curve away from each other at the first bend or curve portion 501 and 601 and then curve back towards each other at portion 502 and 602 to be basically parallel again along an exit surface 33. The second pair of waveguides 7 and 8 have axes 75 and 85 which are sustantially at right angles to the axes 45. These waveguides 7 and 8 also are intially straight and parallel and have a first curve portion 701 and 801 curving away from each other and followed by a second curve portion 702 and 802 curving back to each other so that adjacent an exit surface 123 the two waveguides are spaced apart and are sustantially parallel to each other. The axes 75 and 85 are at an angle α of 90° relative to the axis 45 of the waveguide 4 and to the axis 55 of the waveguide 5 and axis 65 to the waveguide 6. As illustrated, the waveguides 5 and 8 are basically thick light waveguides and the other waveguide 6 and 7 of each pair of waveguides are thinner than the thicker waveguides and also the main waveguide 4. The parting line 80 as well as the filter layer 100 extends at 45° to each of the axes 45, 55, 65, 75 and 85.

After coating of the parting surface with the layers forming the filter layer 100 and after joining the two parts 20 and 30 back together with the waveguide axis 65 intersecting the waveguide axis 75, the multiplexer/demultiplexer is obtained. The multiplexer/demultiplexer 300 is such that the filter layer 100 will be transmissive to one defined wavelength $\lambda_1$ and reflective to another defined wavelength $\lambda_2$. Thus the waveguides 5 and 6 which have axes extending parallel to the axis 45 of the waveguide 4 will handle light of the wavelength $\lambda_1$ while the waveguides 7 and 8 which are at an angle 90° to the axis 45 will handle light of the wavelength $\lambda_2$. As illustrated, the waveguides 6 and 7 which are the thin waveguides are arranged to be adjacent to each other. Also the diameter of the waveguides 5 and 6 of the first pair and the waveguides 7 and 8 of the second pair are expediently selected so that sum of their diameters is equal to the diameter of the main waveguide 4.

Care must also be exercised that all of the curved light waveguides that the radius of curvature is not too small because if the radius of curvature is too small, light losses will occur. The light losses can be adequately avoided when the radius of curvatures are in a millimeter size. For example, if the radius of curvature is selected to be in a range of between 1 mm and 10 mm.

Although various minor modifications may be suggested by those versed in the art, it should be understood that we wish to embody within the scope of the patent granted hereon, all such modifications as reasonably and properly come within the scope of our contribution to the art.

We claim:

1. A method for manufacturing a light waveguide coupler having at least three gates and utilizing a beam splitter principle, said coupler having a carrier member supporting a light waveguide structure with a branching node and branches extending therefrom, said structure being divided at the branching node by a partially light transmitting optical layer, said method comprising of steps of providing a carrier member of glass; manufacturing a continuous branching light waveguide structure with a branching node in the carrier member by providing a metal mask on a surface of the carrier member, said mask having an opening in a pattern corresponding to the shape of the light waveguide structure, and said mask having portions defining two marks on the surface of the carrier member to define a line for a parting plane, and by an ion exchange method with the branching node being at a point approximately adjacent the parting plane; parting the carrier member into two parts by cutting along the parting plane defined by said two marks; polishing the cut surface of each part to form two surfaces of optical qualities; applying a partially light transmitting optical layer to one of the two surfaces of optical quality; and then joining the two parts together with the other surface of optical quality engaging the optical layer and the waveguides of one part being aligned with the waveguides of the other part.

2. A method according to claim 1, wherein said marks are provided in said mask as a pair of strip-shaped openings and at least a portion of the mask adjacent each of said strip-shaped openings is maintained on the carrier part until after the step of parting.

3. A method according to claim 1, wherein the pair of marks are formed by two strips of the metal mask, said two strips being maintained by applying a covering thereto as the remaining portions of the mask are removed before the step of parting the member into two parts.

4. A five gate wavelength multiplexer/demultiplexer operating on a beam splitter principle, said multiplexer/demultiplexer comprising a carrier member supporting a light waveguide structure having a straight main waveguide quadruply branching at a branching node into two pairs of light waveguides, said first pair of light waveguides having axes initially parallel to the axis of the main waveguide and having their end faces separated from the main waveguide by a frequency selective filter layer, said second pair of waveguides having their axes intially extending parallel to each other and at an angle α relative to the axis of the main waveguide, said second pair of waveguides being on the same side of the filter layer as said main waveguide, said filter layer lying on a plane extending perpendicular to the bisector of the angle λ, each of the waveguides of the first and second pair having two curved portions with the first of the curved portion curving away from each other and a second curved portion curving towards each other so that at a distance from the filter layer, the waveguides portions of each pair of waveguides extend sustantially parallel to each other, each of the waveguides of the pair of waveguides having a diameter less than the diameter of the main waveguide and one of the waveguides of each pair of waveguides being a thinner waveguide which is thinner than the other waveguide of each pair which is a thicker waveguide, said thinner waveguides of the first and second pairs being positioned with their axis intersecting at the plane of the filter layer.

5. A five gate wavelength multiplexer/demultiplexer according to claim 4, wherein the sum of the diameter of the thinner waveguide and the thicker waveguide of each pair equals the diameter of the main waveguide.

6. A five gate wavelength multiplexer/demultiplexer according to claim 5, wherein the angle α is selected to equal 90°.

7. A five gate wavelength multiplexer/demultiplexer according to claim 4, wherein the radius of curvature of each of the curve portions of the light waveguides is selected in a millimeter size.

8. A five gate wavelength multiplexer/demultiplexer according to claim 4, wherein the angle α is selected to equal 90°.

9. A method for manufacturing a five gate wavelength multiplexer/demultiplexer utilizing a beam splitter principle, said multiplexer/demultiplexer having a carrier member supporting a light waveguide structure with a branching node and branches extending therefrom, said structure being divided at the branching node by a frequency selective filter layer, said method comprising the steps of providing a carrier member of glass, providing two marks on the surface of the carrier member to define a line for a parting plane, manufacturing a continuous branching light waveguide structure with a branching node in the carrier member by an ion exchange method with the branching node being at a point approximately adjacent the parting plane, said structure having a main waveguide with four waveguides branching therefrom at the branching node, said branching waveguides being arranged in a first pair and a second pair with the waveguides of each of the first and second pair having initially parallel axes and being doubly curved to branch away from each other and back towards each other, the two waveguides of the first pair having their initial portion extending parallel to the axis of the main waveguide and the waveguides of the second pair having their axes branching off at an angle $\alpha$ relative to the axes of the main waveguide, each of the pair of waveguides having one waveguide as a thicker waveguide and one waveguide as a thinner waveguide which has a smaller size than the thicker waveguide and the main waveguide, parting the carrier member into two parts by cutting along the parting plane defined by said two marks with the first pair of waveguides being in one part and the second pair of waveguides and the main waveguide being in the other part, polishing the cut surface of each part to form two surfaces of optical qualities, applying a frequency selective filter layer to one of the two surfaces of optical quality, then joining the two parts together with the other surface of optical quality engaging the filter layer and the waveguides of one part being aligned with the waveguides of the other part.

10. A method according to claim 9. wherein the diameter of the thicker light waveguide and the diameter of the thinner light waveguide of each pair is selected so that their sum equal the diameter of the one main waveguide.

11. A method according to claim 9, wherein the angle $\alpha$ is selected to equal 90°.

12. A method according to claim 9, wherein the radius of curvature of each of the curved light portions of the light waveguides is selected to be in the millimeter size.

* * * * *